US009328945B2

(12) United States Patent
Arai et al.

(10) Patent No.: US 9,328,945 B2
(45) Date of Patent: May 3, 2016

(54) AIR CONDITIONER FOR VEHICLE

(75) Inventors: Fujio Arai, Yokohama (JP); Yutaka Uematsu, Zama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 340 days.

(21) Appl. No.: 13/877,786

(22) PCT Filed: Sep. 27, 2011

(86) PCT No.: PCT/JP2011/072065
§ 371 (c)(1),
(2), (4) Date: Apr. 4, 2013

(87) PCT Pub. No.: WO2012/046594
PCT Pub. Date: Apr. 12, 2012

(65) Prior Publication Data
US 2013/0199217 A1 Aug. 8, 2013

(30) Foreign Application Priority Data

Oct. 6, 2010 (JP) ................................. 2010-226499

(51) Int. Cl.
*F25B 5/02* (2006.01)
*F25B 30/02* (2006.01)
(Continued)

(52) U.S. Cl.
CPC ............ *F25B 30/02* (2013.01); *B60H 1/00278* (2013.01); *B60H 1/00492* (2013.01); *B60H 1/00921* (2013.01); *B60H 1/323* (2013.01); *B60H 1/3211* (2013.01); *B60H 1/3213* (2013.01); *B60L 1/003* (2013.01); *B60L 11/14* (2013.01); *B60L 11/1874* (2013.01);
(Continued)

(58) Field of Classification Search
CPC ...... F25B 5/02; B60H 1/00278; B60H 1/143; B60H 1/22; B60H 1/32
See application file for complete search history.

(56) References Cited

U.S. PATENT DOCUMENTS 7,003,975 B2    2/2006  Feuerecker
2002/0043413 A1*  4/2002  Kimishima ............ B60H 1/323
                                                          180/68.1
(Continued)

FOREIGN PATENT DOCUMENTS

EP    1 039 250 A2    9/2000
JP    5-178070 A      7/1993
(Continued)

OTHER PUBLICATIONS

European Search Report, Feb. 24, 2014, 4 pages.

*Primary Examiner* — Emmanuel Duke
(74) *Attorney, Agent, or Firm* — Foley & Lardner LLP

(57) ABSTRACT

An air conditioner for a vehicle includes: a compressor (21); an internal heat exchanger (22, 24) which exchanges heat between the refrigerant and air in an interior space; an external heat exchanger (23) which exchanges heat between the refrigerant and outside air; a battery (5); a battery heat exchanger (29) which exchanges heat between the refrigerant and the battery by causing the refrigerant, which travels to the compressor from the external heat exchanger, to go through the battery heat exchanger; a throttle adjusting part (30) which is arranged in a refrigerant flow passage on an upstream side of the battery heat exchanger; and a control unit (40). The control unit (40) controls the flow of the refrigerant through the throttle adjusting part based on an extra heat exchange capacity that is an extra capacity of the external heat exchanger with respect to the internal heat exchanger.

9 Claims, 3 Drawing Sheets

(51) Int. Cl.

| | | |
|---|---|---|
| *B60H 1/00* | (2006.01) | |
| *B60H 1/32* | (2006.01) | |
| *B60L 11/18* | (2006.01) | |
| *B60L 1/00* | (2006.01) | |
| *B60L 11/14* | (2006.01) | |
| *H01M 10/625* | (2014.01) | |
| *H01M 10/663* | (2014.01) | |
| *H01M 10/48* | (2006.01) | |

(52) U.S. Cl.
CPC ......... *B60L11/1875* (2013.01); *B60L 11/1887* (2013.01); *F25B 5/02* (2013.01); *H01M 10/625* (2015.04); *H01M 10/663* (2015.04); *B60H 2001/00307* (2013.01); *B60H 2001/3258* (2013.01); *B60H 2001/3261* (2013.01); *B60L 2240/34* (2013.01); *B60L 2240/545* (2013.01); *B60L 2240/662* (2013.01); *B60L 2270/46* (2013.01); *F25B 2341/066* (2013.01); *F25B 2600/2513* (2013.01); *H01M 10/486* (2013.01); *Y02T 10/70* (2013.01); *Y02T 10/705* (2013.01); *Y02T 10/7077* (2013.01); *Y02T 10/7291* (2013.01); *Y02T 90/16* (2013.01); *Y02T 90/34* (2013.01)

(56) References Cited

U.S. PATENT DOCUMENTS

| | | | | |
|---|---|---|---|---|
| 2004/0069012 | A1* | 4/2004 | Inoue | B60H 1/02 62/500 |
| 2004/0163398 | A1 | 8/2004 | Morishita et al. | |
| 2005/0028542 | A1* | 2/2005 | Yoshida | B60H 1/00278 62/186 |
| 2006/0080986 | A1* | 4/2006 | Inoue | B60H 1/00057 62/259.2 |
| 2006/0169507 | A1* | 8/2006 | Inoue | B60K 11/02 180/68.4 |
| 2008/0229770 | A1 | 9/2008 | Liu | |
| 2009/0071178 | A1* | 3/2009 | Major | B60H 1/00278 62/239 |
| 2009/0078400 | A1* | 3/2009 | Tamura | B60H 1/00278 165/287 |
| 2009/0249802 | A1* | 10/2009 | Nemesh | B60H 1/00278 62/56 |
| 2009/0249803 | A1* | 10/2009 | Suzuki | B60H 1/00278 62/56 |
| 2009/0280395 | A1* | 11/2009 | Nemesh | B60H 1/00278 429/62 |
| 2010/0175406 | A1* | 7/2010 | Wankhede | B60H 1/00278 62/285 |
| 2010/0300646 | A1* | 12/2010 | Sawaguchi | H01M 10/48 165/51 |

FOREIGN PATENT DOCUMENTS

| | | |
|---|---|---|
| JP | 5-344606 A | 12/1993 |
| JP | 10-100661 A | 4/1998 |
| JP | 2002-313441 A | 10/2002 |
| JP | 2004-155294 A | 6/2004 |
| JP | 2004-255960 A | 9/2004 |
| JP | 2005-297684 A | 10/2005 |
| JP | 2008-055990 A | 3/2008 |
| JP | 2008-213830 A | 9/2008 |
| WO | WO 03/057518 A1 | 7/2003 |

* cited by examiner

AIR CONDITIONER FOR VEHICLE

TECHNICAL FIELD

The present invention relates to an air conditioner for a vehicle. The present invention relates especially to an air conditioner for a vehicle, which is applicable to a vehicle equipped with a battery.

BACKGROUND ART

Conventionally, an air conditioner for a vehicle, which controls temperature and so on in an interior space, is known. For example, Patent Literature 1 discloses an air conditioner for a vehicle, which uses a heat capacity of a battery that is installed in an electric vehicle. In this air conditioner for a vehicle, air in an interior space is sucked in from an intake provided in a rear part of the vehicle, and the air is passed through a battery part under a floor via a duct. Thus, air is heated and then blown out again into the interior space after a temperature of the heated air is controlled by an air conditioner body. This makes it possible to obtain high-temperature hot air without needing to equip a separate heat storage material.

CITATION LIST

Patent Literature

Patent Literature 1: Japanese Patent Unexamined Publication No. H5-178070

SUMMARY OF INVENTION

However, the air conditioner disclosed in Patent Literature 1 only radiates heat of the battery directly to air to be supplied into the interior space. Therefore, the battery with a large heat capacity is far from fully used.

The present invention was accomplished in view of such a problem of the conventional technology. An object of the present invention is to provide an air conditioner for a vehicle with excellent thermal efficiency by utilizing a battery having a large heat capacity.

An air conditioner for a vehicle according to a first aspect of the present invention includes a compressor which compresses a refrigerant; an internal heat exchanger which exchanges heat between the refrigerant and air to be supplied into an interior space; an external heat exchanger which exchanges heat between the refrigerant and outside air that is air outside of the interior space; a battery installed in the vehicle; a battery heat exchanger which exchanges heat between the refrigerant and the battery by causing at least a part of the refrigerant, which travels to the compressor from the external heat exchanger, to go through the battery heat exchanger; a throttle adjusting part which is arranged in a refrigerant flow passage on an upstream side of the battery heat exchanger, and is able to adjust a flow of the refrigerant; and a control unit which controls the throttle adjusting part. The control unit controls the flow of the refrigerant through the throttle adjusting part based on an extra heat exchange capacity that is an extra capacity of the external heat exchanger with respect to the internal heat exchanger in terms of heat quantity.

A method for controlling an air conditioner for a vehicle according to a second aspect of the present invention includes the step of providing a compressor which compresses a refrigerant; an internal heat exchanger which exchanges heat between the refrigerant and air to be supplied into an interior space; an external heat exchanger which exchanges heat between the refrigerant and outside air that is air outside of the interior space; a battery installed in the vehicle; a battery heat exchanger which exchanges heat between the refrigerant and the battery by causing at least a part of the refrigerant, which travels to the compressor from the external heat exchanger, to go through the battery heat exchanger; a throttle adjusting part which is arranged in a refrigerant flow passage on an upstream side of the battery heat exchanger, and is able to adjust a flow of the refrigerant. In addition, the controlling method further includes the step of controlling the flow of the refrigerant through the throttle adjusting part based on an extra heat exchange capacity that is an extra capacity of the external heat exchanger with respect to the internal heat exchanger in terms of heat quantity.

DESCRIPTION OF EMBODIMENTS

An embodiment of the present invention will be described below based on the drawings.

Figure 1:
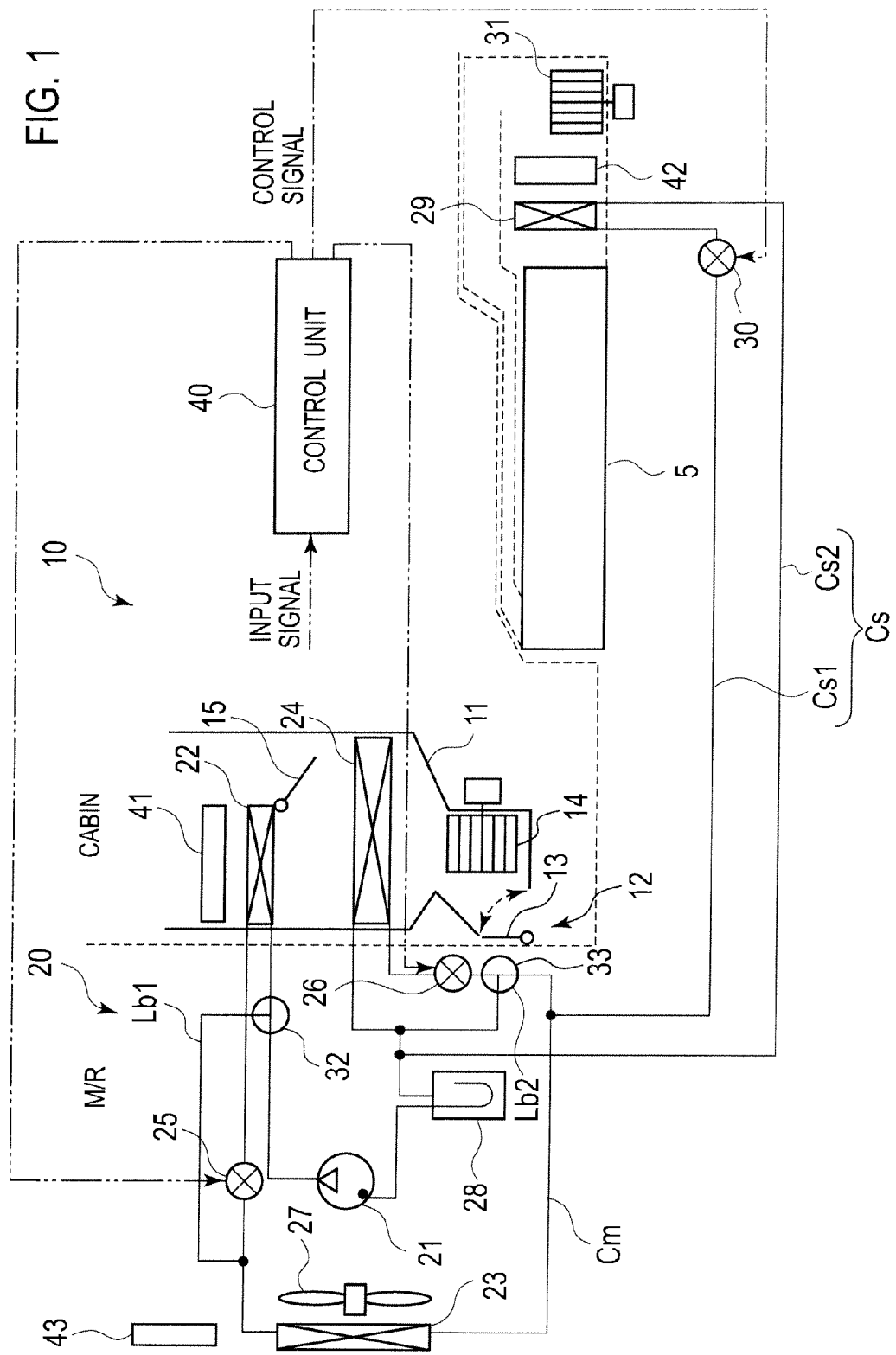
FIG. 1 is an explanatory view schematically showing a configuration of an air conditioner for a vehicle according to an embodiment of the present invention

FIG. 1 is an explanatory view schematically showing a configuration of an air conditioner 10 for a vehicle according to the embodiment of the present invention. The air conditioner 10 for a vehicle is applied to an electric vehicle, and is a heat pump-type air conditioner that controls a temperature and so on in an interior space. In the electric vehicle, a motor (not shown) serving as a driving source is installed in a motor room (M/R) in a front of the vehicle. A battery 5 that supplies electric power to the motor and various electrical components is installed under a floor of an interior space.

The air conditioner 10 for a vehicle is configured mainly by an air blowing unit 11, an air conditioner body 20, and a control unit 40.

The air blowing unit 11 is a unit that takes in air in the interior space (inside air) or air outside of the interior space (outside air), and supplies the air into the interior space, and is provided with an air blowing duct that blows air. An intake section 12 is provided on an upstream side of the air blowing duct, and the intake section 12 includes an intake door 13. The intake door 13 is a movable door that allows one of an inside air inlet or an outside air inlet to be closed, and, it is possible to select either inside air or outside air as air to be supplied into the interior space by operating the intake door 13. The air blowing duct is also provided with a blower 14, and inside air or outside air is sent out to downstream by operating the blower 14. Air (inside air or outside air) that is sent out to the downstream is supplied into the interior space from an outlet (not shown) via a later-described first internal heat exchanger 22 or a second internal heat exchanger 24.

The air conditioner body 20 is configured mainly by a compressor 21, the first internal heat exchanger 22, an external heat exchanger 23, the second internal heat exchanger 24, a first expansion valve 25, and a second expansion valve 26. These elements that configure the air conditioner body 20 are respectively provided in a closed-loop refrigerant flow passage (a main refrigerant flow passage) Cm in which a refrigerant circulates. With the main refrigerant flow passage Cm, the refrigerant travels from the compressor 21, passes through the first internal heat exchanger 22, the external heat exchanger 23, and the second internal heat exchanger 24 in this order, and returns to the compressor 21. In the main refrigerant flow passage Cm, the first expansion valve 25 is provided between the first internal heat exchanger 22 and the external heat exchanger 23, and the second expansion valve 26 is provided between the external heat exchanger 23 and the second internal heat exchanger 24.

Once taking in the refrigerant from an intake side, the compressor 21 compresses the refrigerant taken in, and discharges the compressed refrigerant from a discharge side. The compressor 21 is driven by electric power supplied from the battery 5.

The first internal heat exchanger 22 exchanges heat between the refrigerant that is sent under pressure by the compressor 21 and air to be supplied into the interior space. The first internal heat exchanger 22 acts as a condenser when an operation mode of the air conditioner 10 for a vehicle specified by a user is a heating mode. Therefore, the first internal heat exchanger 22 radiates heat of the refrigerant to air to be supplied into the interior space, in other words, air that is sent out by the blower 14.

The external heat exchanger 23 is arranged in a front end part of the motor room, and exchanges heat between the refrigerant that passed through the first expansion valve 25 and outside air. The external heat exchanger 23 causes the refrigerant to absorb heat in outside air when the operation mode is the heating mode, and radiates heat of the refrigerant to outside air when the operation mode is a cooling mode. The external heat exchanger 23 is provided with a blowing fan 27 in order to promote efficiency of heat exchange between outside air and the refrigerant.

The second internal heat exchanger 24 exchanges heat between the refrigerant that passed through the second expansion valve 26, and the air to be supplied into the interior space. The second internal heat exchanger 24 acts as an evaporator when the operation mode is the cooling mode. Therefore, the second internal heat exchanger 24 causes the refrigerant to absorb heat of air that is to be supplied into the interior space, in other words, air that was sent out from the blower 14.

In the first expansion valve 25 provided on the downstream of the first internal heat exchanger 22, and the second expansion valve 26 provided on the downstream of the external heat exchanger 23, throttle expansion is performed as the refrigerant passes therethrough. In other words, as the refrigerant passes through the first and second expansion valves 25 and 26, the refrigerant is changed into a refrigerant at low temperature and low pressure. In the first and second expansion valves 25 and 26, throttle, that is a refrigerant passing area (valve opening) is adjustable, and it is possible to set the throttle or open the throttle as necessary.

In the first expansion valve 25, when the operation mode is the heating mode, a given throttle is set and the refrigerant is throttled and expanded. Meanwhile, in the first expansion valve 25, when the operation mode is the cooling mode, the throttle is opened, thus allowing the refrigerant to pass therethrough as it is. On the contrary, in the second expansion valve 26, when the operation mode is the cooling mode, a given throttle is set and the refrigerant is throttled and expanded. Meanwhile, in the second expansion valve 26, when the operation mode is the heating mode, the throttle is opened and the refrigerant is allowed to pass therethrough as it is.

In the main refrigerant flow passage Cm, an accumulator 28 is provided between the second internal heat exchanger 24 and the compressor 21. The accumulator 28 has functions to separate the refrigerant supplied from an upstream process into a gas phase and a liquid phase, send the refrigerant in the gas phase to a downstream process, and temporarily accumulate the refrigerant in the liquid phase.

Here, as one of features of the present embodiment, the air conditioner body 20 further includes a battery heat exchanger 29. One ends of sub refrigerant flow passages Cs for supplying and discharging a refrigerant are connected to the battery heat exchanger 29, respectively. The battery heat exchanger 29 exchanges heat between the refrigerant and the battery 5. The other end of the sub refrigerant flow passage Cs1 for supplying a refrigerant is connected to the main refrigerant flow passage Cm between the external heat exchanger 23 and the second expansion valve 26. The other end of the sub refrigerant flow passage Cs2 for discharging a refrigerant is connected between the second internal heat exchanger 24 and the compressor 21. The battery heat exchanger 29 exchanges heat between the refrigerant that passed through the external heat exchanger 23, and the battery, by making a part of or the entire refrigerant, which travels from the external heat exchanger 23 to the compressor 21, go through the battery heat exchanger 29. The refrigerant after heat thereof is exchanged by the battery heat exchanger 29 is returned to the compressor 21.

In the sub refrigerant flow passage Cs1 that supplies a refrigerant to the battery heat exchanger 29, a third expansion valve 30 (a throttle adjusting part) is arranged on an upstream side of the battery heat exchanger 29. Similarly to the first and second expansion valves 25 and 26, the third expansion valve 30 is configured so that a flow of the refrigerant (valve opening to be specific) is adjustable. By adjusting a state of a throttle, the third expansion valve 30 throttles and expands the refrigerant or lets the refrigerant pass therethrough as it is. Thus, the refrigerant absorbs heat of the battery 5, or heat of the refrigerant is radiated to the battery 5 in the battery heat exchanger 29. The third expansion valve 30 is able to close the throttle thereof.

In the present embodiment, the battery heat exchanger 29 is configured to exchange heat between the refrigerant and air surrounding the battery 5. Therefore, in a viewpoint of improving efficiency of heat exchange between the battery 5 and the refrigerant, a blower 31 is provided in order to make air surrounding the battery 5 flow.

Also, in the main refrigerant flow passage Cm, a first bypass flow passage Lb1, which bypasses the first internal heat exchanger 22, is provided. To be specific, one end of the first bypass flow passage Lb1 is connected between the compressor 21 and the first internal heat exchanger 22, and the other end thereof is connected between the first expansion valve 25 and the external heat exchanger 23. In a connecting part of the first bypass flow passage Lb1 and the main refrigerant flow passage Cm, a first switching valve (for example, a three-way valve) 32 is provided for switching between a flow of the refrigerant going through the first internal heat exchanger 22 and bypassing the first internal heat exchanger 22. Basically, the first switching valve 32 is set to close the bypass flow passage Lb1.

Similarly, in the main refrigerant flow passage Cm, a second bypass flow passage Lb2 is provided, which bypasses the second expansion valve 26 and the second internal heat exchanger 24. To be specific, one end of the second bypass flow passage Lb2 is connected between a connecting part of the sub refrigerant flow passage Cs1 for supplying a refrigerant, and the second expansion valve 26, and the other end thereof is connected between the second internal heat exchanger 24 and the sub refrigerant flow passage Cs2 for discharging a refrigerant. In a connecting part of the second bypass flow passage Lb2 and the main refrigerant flow passage Cm, a second switching valve (for example, a three-way valve) 33 is provided for switching between a flow of the refrigerant going through the second expansion valve 26 and the second internal heat exchanger 24, and bypassing the second expansion valve 26 and the second internal heat exchanger 24. Basically, the second switching valve 33 is set to close the bypass flow passage Lb2.

The control unit 40 has a function to perform integrated control of the air conditioner 10 for a vehicle. As the control unit 40, a microcomputer that is mainly configured of, for example, a CPU, a ROM, a RAM, and an input-output interface, may be used. The control unit 40 performs an operation related to air conditioning control in accordance with a control program stored in the ROM. The control unit 40 then outputs a control variable (a control signal), calculated by the operation, to the actuator. In order to perform such processing, various input signals including sensor signals are input to the control unit 40.

An air conditioning temperature sensor 41 is arranged on a downstream side of the air blowing duct, and detects a temperature of air that is blown out into the interior space, more specifically, air that passed through the first or second internal heat exchanger 22 or 24. A sensor signal from the air conditioning temperature sensor 41 is referred to in order to control an air conditioning temperature. A battery temperature sensor 42 is a sensor that detects a temperature of the battery 5 through a temperature in an under-floor space where the battery 5 is housed. An outside air temperature sensor 43 is a sensor that detects a temperature of outside air. For the individual temperature sensors 41, 42, and 43, a PTC thermistor or the like may be used.

In relation to the present embodiment, the control unit 40 controls states of the first to third expansion valves 25, 26, and 30, in other words, throttles of the first to third expansion valves 25, 26, and 30, respectively. Specifically, the states of the first and second expansion valves 25 and 26 are controlled depending on the operation mode of the air conditioner 10 for a vehicle. Namely, when the operation mode is the heating mode, the control unit 40 sets a given throttle for the first expansion valve 25, and opens the throttle of the second expansion valve 26. Meanwhile, when the operation mode is the cooling mode, the control unit 40 opens the throttle of the first expansion valve 25, and sets a given throttle for the second expansion valve 26.

On the contrary, the third expansion valve 30 is controlled in consideration of an extra heat exchange capacity of the external heat exchanger 23, and a detection result of the battery temperature sensor 42, in addition to the operation mode. Here, in the case of the heating mode, the extra heat exchange capacity means an extra capacity of a heat absorption amount of the external heat exchanger 23 with respect to a heat radiation amount of the first internal heat exchanger 22 in terms of heat quantity. In the case of the cooling mode, the extra heat exchange capacity means an extra capacity of a heat radiation amount of the external heat exchanger 23 with respect to a heat absorption amount of the second internal heat exchanger 24 in terms of heat quantity. The extra capacity of the heat absorption amount of the external heat exchanger 23 with respect to the heat radiation amount of the first internal heat exchanger 22 in terms of heat quantity is referred to as an "extra capacity of a heat absorption amount". The extra capacity of the heat radiation amount of the external heat exchanger 23 with respect to the heat absorption amount of the second internal heat exchanger 24 in terms of heat quantity is referred to as an "extra capacity of a heat radiation amount".

Figure 2:
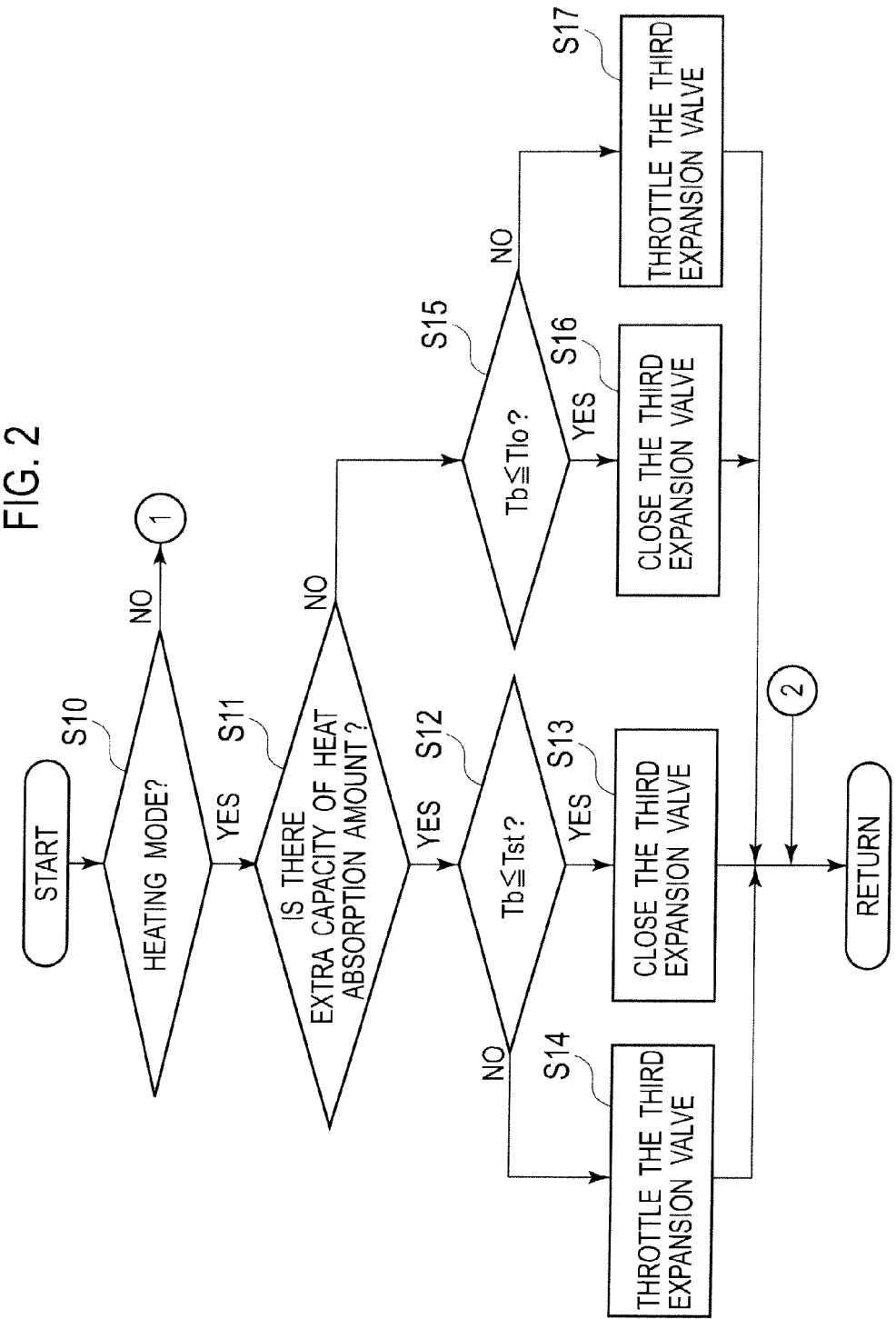
FIG. 2 is a flowchart showing a control procedure of a third expansion valve.
Figure 3:
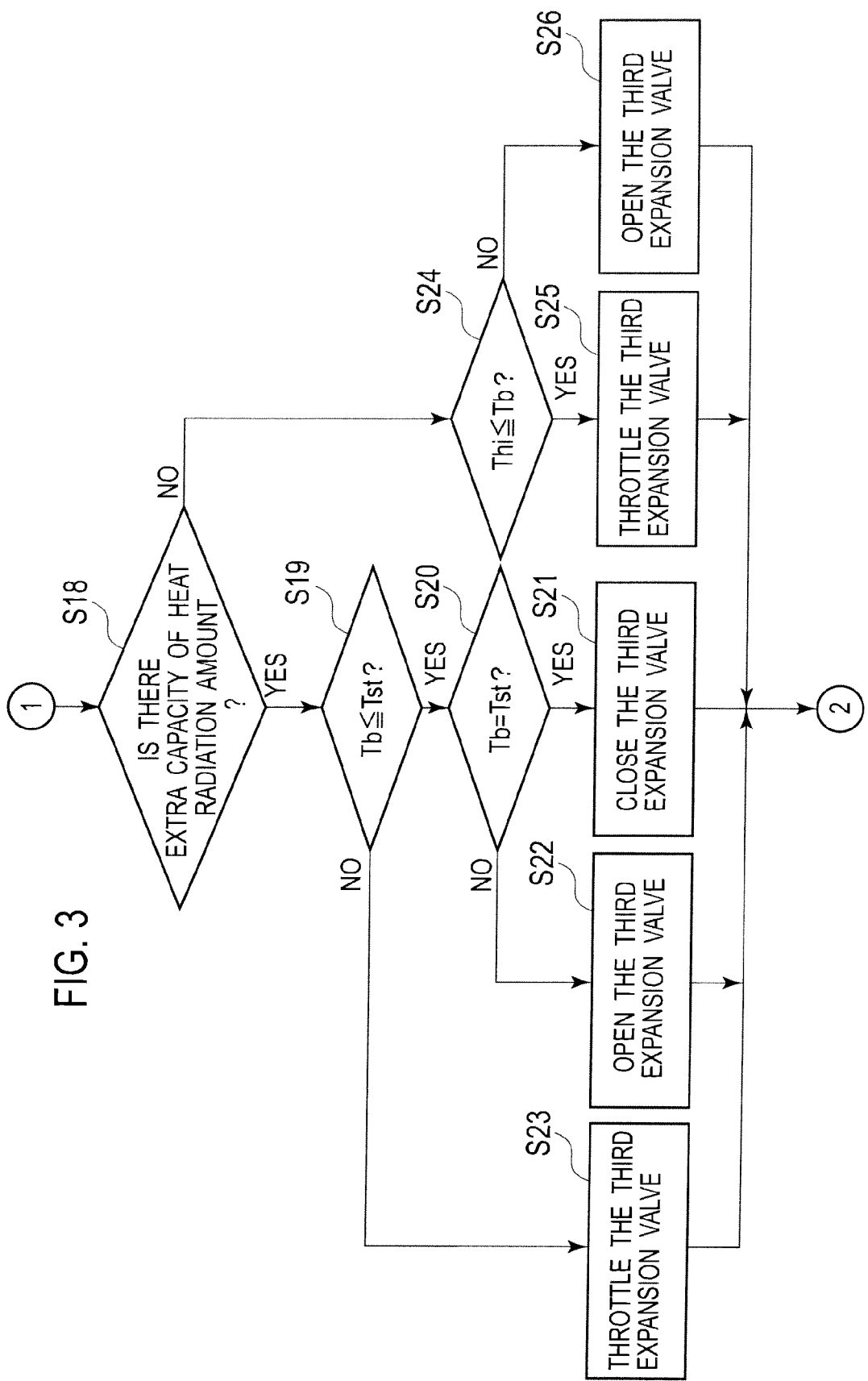
FIG. 3 is a flowchart showing a control procedure of the third expansion valve.

FIG. 2 and FIG. 3 are flowcharts showing a control procedure of the third expansion valve 30. The processing shown in the flowcharts is started as the air conditioner 10 for a vehicle is switched on by a user, and is executed by the control unit 40 within a predetermined period.

First, in a step 10 (S10), the control unit 40 determines whether or not the operation mode is the heating mode. In a case where the determination is affirmative in the step 10, in other words, when the operation mode is the heating mode, the processing moves to a step 11 (S11). On the other hand, in a case where the determination is negative in the step 10, in other words, when the operation mode is the cooling mode, the processing moves to a step 18 (S18) that is described later.

In the step 11, the control unit 40 determines whether or not there is the extra capacity of a heat absorption amount. In other words, the control unit 40 determines whether or not the external heat exchanger 23 is able to absorb a quantity of heat from outside air in the heating mode, the quantity of heat being radiated by the first internal heat exchanger 22 to air within the air blowing duct. This determination is made after referring to detection results of the air conditioning temperature sensor 41 and the outside temperature sensor 43. When the determination is affirmative in the step 11, in other words, when there is the extra capacity of a heat absorption amount, the processing moves to a step 12 (S12). Meanwhile, when the determination is negative in the step 11, in other words, when there is no extra capacity of a heat absorption amount, and a heat absorption amount is insufficient, the processing moves to a step 15 (S15) that is described later.

In the step 12, the control unit 40 determines whether or not a detection result of the battery temperature sensor 42, in other words, a battery temperature Tb, is equal to or lower than an optimum temperature Tst within a temperature range that is set to control a temperature of the battery 5. Hereinafter, the temperature range that is set to control the temperature of the battery 5 will be referred to as a "controlled temperature range". The controlled temperature range indicates a temperature range in which the battery 5 is able to provide a desired performance. Also, values of the range (a range between a lower limit temperature Tlo, and an upper limit temperature Thi), and the optimum temperature Tst are previously set based on experiments and simulations.

In a case where the determination is affirmative in the step 12, in other words, in a case where the battery temperature Tb is equal to or lower than the optimum temperature Tst, the processing moves to a step 13 (S13). Meanwhile, in a case where the determination is negative in the step 12, in other words, in a case where the battery temperature Tb is higher than the optimum temperature Tst, the processing moves to a step 14 (S14).

In the step 13, the control unit 40 controls the third expansion valve 30 and shuts the third expansion valve 30. On the contrary, in the step 14, the control unit 40 sets a given throttle for the third expansion valve 30 so as to throttle and expand the refrigerant that passes therethrough.

Meanwhile, when there is no extra capacity of a heat absorption amount, in the step 15, the control unit 40 determines whether or not the battery temperature Tb is equal to or lower than the lower limit temperature Tlo within the controlled temperature range of the battery 5. In a case where the determination in the step 15 is affirmative, in other words, in a case where the battery temperature Tb is equal to or lower than the lower limit temperature Tlo, the processing moves to a step 16 (S16). Meanwhile, in a case where the determination is negative in the step 15, in other words, in a case where the battery temperature Tb is higher than the lower limit temperature Tlo, the processing moves to a step 17 (S17).

In the step 16, the control unit 40 controls the throttle of the third expansion valve 30, and shuts the third expansion valve 30. On the contrary, in the step 17, the control unit 40 sets a given throttle for the third expansion valve 30 so as to throttle and expand the refrigerant that passes therethrough.

Meanwhile, when the operation mode is the cooling mode, in the step 18, the control unit 40 determines whether or not there is the extra capacity of a heat radiation amount. In other words, the control unit 40 determines whether or not the external heat exchanger 23 is able to radiate an amount of absorbed heat to the outside air in the cooling mode, the amount of absorbed heat being absorbed by the second internal heat exchanger 24 from air in the air blowing duct. This determination is made after referring to the detection results of the air conditioning temperature sensor 41 and the outside air temperature sensor 43. In a case where the determination is affirmative in the step 18, in other words, in a case where there is the extra capacity of a heat radiation amount, the processing moves to a step 19 (S19). Meanwhile, in a case where the determination is negative in the step 18, in other words, in a case where there is no extra capacity of a heat radiation amount, and a heat radiation amount is insufficient, the processing moves to a step 24 (S24) that is described later.

In the step 19, the control unit 40 determines whether or not the battery temperature Tb is equal to or lower than the optimum temperature Tst within the controlled temperature range of the battery 5. In a case where the determination is affirmative in the step 19, in other words, in a case where the battery temperature Tb is equal to or lower than the optimum temperature Tst, the processing moves to a step 20 (S20). Meanwhile, in a case where the determination is negative in the step 19, in other words, in a case where the battery temperature Tb is higher than the optimum temperature Tst, the processing moves to a step 23 (S23).

In the step 20, the control unit 40 determines whether or not the battery temperature Tb is the optimum temperature Tst within the controlled temperature range of the battery 5. In a case where the determination is affirmative in the step 20, in other words, in the case where the battery temperature Tb is the optimum temperature Tst, the processing moves to a step 21 (S21). Meanwhile, in a case where the determination is negative in the step 20, in other words, in a case where the battery temperature Tb is lower than the optimum temperature Tst, the processing moves to a step 22 (S22).

In the step 21, the control unit 40 controls the throttle of the third expansion valve 30, and shuts the third expansion valve 30. On the contrary, in the step 22, the control unit 40 opens the throttle of the third expansion valve 30 so that the refrigerant passes through the third expansion valve 30 as it is. Meanwhile, in the step 23, the control unit 40 sets a given throttle for the third expansion valve 30 so as to throttle and expand the refrigerant that passes therethrough.

Meanwhile, when there is no extra capacity of a heat radiation amount, in the step 24, the control unit 40 determines whether or not the battery temperature Tb is equal to or higher than the upper limit temperature Thi within the controlled temperature range of the battery 5. In a case where the determination is affirmative in the step 24, in other words, in a case where the battery temperature Tb is equal to or higher than the upper limit temperature Thi, the processing moves to a step 25 (S25). Meanwhile, in a case where the determination is negative in the step 24, in other words, in a case where the battery temperature Tb is lower than the upper limit temperature Thi, the processing moves to a step 26 (S26).

In the step S25, the control unit 40 sets a given throttle for the third expansion valve 30 so as to throttle and expand the refrigerant that passes therethrough. On the contrary, in the step 26, the control unit 40 opens the throttle so that the refrigerant passes through the third expansion valve 30 as it is.

Once the states of the first to third expansion valves 25, 26, and 30 are set by using the method described above, the air conditioner 10 for a vehicle operates depending on the heating mode or the cooling mode.

When the operation mode is the heating mode, the first internal heat exchanger 22 acts as a condenser. Specifically, the refrigerant compressed by the compressor 21 is changed into a high-temperature and high-pressure state. The refrigerant in the high-temperature and high-pressure state is supplied to the first internal heat exchanger 22. In the first internal heat exchanger 22, heat of the refrigerant is radiated to air within the air blowing duct. Accordingly, heated air is supplied into the interior space. The refrigerant that passed through the first internal heat exchanger 22 is throttled and expanded by passing through the first expansion valve 25, and changed into a low-temperature and low-pressure state. The refrigerant in the low-temperature and low-pressure state is supplied to the external heat exchanger 23. The temperature of the refrigerant is lower than that of outside air, and heat of outside air is absorbed in the refrigerant in the external heat exchanger 23. A part of the refrigerant that passed through the external heat exchanger 23 is branched off to the sub refrigerant flow passage Cs, and then supplied to the battery heat exchanger 29 via the third expansion valve 30. The refrigerant that passed through the battery heat exchanger 29 then returns to the compressor 21.

TABLE 1

| Operation state | Status of external heat exchanger | Battery temperature | | | | |
|---|---|---|---|---|---|---|
| | | Tb ≤ Tlo | Tlo < Tb < Tst | Tb = Tst | Tst < Tb < Thi | Thi ≤ Tb |
| Cooling | Extra capacity of heat radiation amount available | Heat radiation | Heat radiation | — | Heat absorption | Heat absorption |
| | Insufficient heat radiation amount | Heat radiation | Heat radiation | Heat radiation | Heat radiation | Heat absorption |
| Heating | Insufficient heat absorption amount | — | Heat absorption | Heat absorption | Heat absorption | Heat absorption |
| | Extra capacity of heat absorption amount available | — | — | — | Heat absorption | Heat absorption |

Table 1 shows operation states of the battery heat exchanger 29. The battery heat exchanger 29 operates in states described below depending on a state of the third expansion valve 30. To be specific, when a heat absorption amount of the external heat exchanger 23 is insufficient, and the battery temperature Tb is equal to or lower than the lower limit temperature Tlo within the controlled temperature range of the battery 5, the battery heat exchanger 29 does not operate as a heat exchanger. On the other hand, when a heat absorption amount of the external heat exchanger 23 is insufficient, and the battery temperature Tb is higher than the lower limit temperature Tlo, the battery heat exchanger 29 operates as an evaporator that causes the refrigerant to absorb heat of the battery 5.

Also, when the external heat exchanger 23 has an extra capacity of a heat absorption amount, and the battery temperature Tb is equal to or lower than the optimum temperature Tst within the controlled temperature range of the battery 5, the battery heat exchanger 29 does not operate as a heat exchanger. On the other hand, when the external heat exchanger 23 has an extra capacity of a heat absorption amount, and the battery temperature Tb is higher than the optimum temperature Tst, the battery heat exchanger 29 operates as an evaporator that causes the refrigerant to absorb heat of the battery 5.

In the refrigerant that passed the external heat exchanger 23, the refrigerant that is not branched off to the sub refrigerant flow passage Cs returns to the compressor 21 after passing through the second expansion valve 26 and the second internal heat exchanger 24. In this case, the second expansion valve 26 is completely open, and has no throttle expansion acting on the refrigerant, which can be considered the same as a configuration where the refrigerant that passed through the external heat exchanger 23 returns to the compressor 21. However, in order to avoid influence of heat exchange conducted in the second internal heat exchanger 24 between the refrigerant and air in the air blowing duct, the control unit 40 may control the second switching valve 33. In other words, the control unit 40 opens the second bypass flow passage Lb2, and closes the main refrigerant flow passage Cm that leads to the second internal heat exchanger 24. In this case, the entire refrigerant that passed through the external heat exchanger 23 returns to the compressor 21 via the battery heat exchanger 29.

On the contrary, when the operation mode is the cooling mode, the second internal heat exchanger 24 operates as an evaporator. To be specific, the refrigerant compressed by the compressor 21 is changed into a high-temperature and high-pressure state, and the refrigerant in the high-temperature and high-pressure state is supplied to the external heat exchanger 23 via the first internal heat exchanger 22 and the first expansion valve 25. In the external heat exchanger 23, heat of the refrigerant is radiated to outside air. A part of the refrigerant that passed the external heat exchanger 23 flows straight through the main refrigerant flow passage Cm, is throttled and expanded by passing through the second expansion valve 26, and changed into a low-temperature and low-pressure state. The refrigerant in the low-temperature and low-pressure state is supplied to the second internal heat exchanger 24. In the second internal heat exchanger 24, heat of air in the air blowing duct is absorbed by the refrigerant. Thus, cooled air is supplied into the interior space. Then, the refrigerant that passed through the second internal heat exchanger 24 returns to the compressor 21. A part of the refrigerant that passed through the external heat exchanger 23 is branched off to the sub refrigerant flow passage Cs, and then supplied to the battery heat exchanger 29 via the third expansion valve 30. Thereafter, the refrigerant that passed through the battery heat exchanger 29 is returned to the compressor 21.

As shown in Table 1, the battery heat exchanger 29 operates in states described below depending on a state of the third expansion valve 30. To be specific, when the external heat exchanger 23 has an extra capacity of a heat radiation amount, and the battery temperature Tb is lower than the optimum temperature Tst within the controlled temperature range of the battery 5, the battery heat exchanger 29 operates as a condenser that radiates heat of the refrigerant to the battery 5. On the other hand, when the external heat exchanger 23 has an extra capacity of a heat radiation amount, and the battery temperature Tb is the optimum temperature Tst, the battery heat exchanger 29 does not operate as a heat exchanger. Further, when the external heat exchanger 23 has an extra capacity of a heat radiation amount, and the battery temperature Tb is higher than the optimum temperature Tst, the battery heat exchanger 29 operates as an evaporator that causes the refrigerant to absorb heat of the battery 5.

When a heat radiation amount of the external heat exchanger 23 is insufficient, and the battery temperature Tb is lower than the upper limit temperature Thi within the controlled temperature range of the battery 5, the battery heat exchanger 29 operates as a condenser that radiates heat of the refrigerant to the battery 5. On the other hand, when a heat radiation amount of the external heat exchanger 23 is insufficient, and the battery temperature Tb is higher than the upper limit temperature Thi, the battery heat exchanger 29 operates as an evaporator that causes the refrigerant to absorb heat of the battery 5.

The refrigerant that is sent under pressure from the compressor 21 is supplied to the external heat exchanger 23 after passing through the first internal heat exchanger 22 and the first expansion valve 25. In this case, the first expansion valve 25 is completely open, and thus has no throttle expansion acting on the refrigerant. However, in order to inhibit heat exchange by the first internal heat exchanger 22, the control unit 40 may control an air regulating section 15, which regulates a flow of air within the air blowing duct, so as to close a flow passage to the first internal heat exchanger 22. Alternatively, the control unit 40 may control the first switching valve 32 to open the first bypass flow passage Lb1 and close the main refrigerant flow passage Cm that leads to the first internal heat exchanger 22 and the first expansion valve 25. As a refrigerating cycle, such a configuration can be considered the same as a configuration where the refrigerant sent under pressure from the compressor 21 is supplied directly to the external heat exchanger 23.

As explained so far, in the present embodiment, the air conditioner 10 for a vehicle includes the compressor 21, the first internal heat exchanger 22, the first expansion valve 25, and the external heat exchanger 23, and configures a refrigerating cycle by circulating the refrigerant among these elements. The air conditioner 10 for a vehicle further includes the battery heat exchanger 29 and the third expansion valve (throttle adjusting part) 30, and a part of the above-mentioned refrigerating cycle is configured by circulating the refrigerant also through these elements.

Here, in the case of the heating mode in which the first internal heat exchanger 22 acts as a condenser, the control unit 40 of the air conditioner 10 for a vehicle controls the state of the third expansion valve 30 based on an extra capacity of a heat absorption amount, and a detection result of the battery temperature sensor 42. The extra capacity of a heat absorption amount means an extra capacity of a heat absorption amount of the external heat exchanger 23 with respect to a heat radiation amount of the first internal heat exchanger 22 in terms of heat quantity. With such a configuration, as the battery 5 having a large heat capacity is added to a part of a refrigerating cycle, heat transport from the battery 5 is enabled by the refrigerating cycle. Thus, it is possible to absorb thermal energy effectively, and the refrigerating cycle is thereby operated efficiently without causing an increase in load.

Also, in a case where heat of a battery is radiated directly to air to be supplied into an interior space, a dehumidifying load is applied during the heating mode, and it is likely that power of the compressor is increased. In this regard, according to the present embodiment, heat of the battery 5 is transported by the refrigerating cycle. Therefore, the load for dehumidifying air to be supplied into an interior space is reduced, compared to the configuration where air is heated directly by heat of the battery. Therefore, a load on the compressor 21 is able to be reduced, and the refrigerating cycle is thus operated efficiently.

Also, in the present embodiment, when the external heat exchanger 23 has no extra capacity of a heat absorption amount, the control unit 40 sets a throttle for the third expansion valve 30 so that the refrigerant that passes through the third expansion valve 30 is throttled and expanded. With such a configuration, thermal energy of the battery 5 is able to be absorbed in the battery heat exchanger 29. Thus, it is possible to ensure a capability to heat the interior space, and a load on the compressor 21 is reduced. Hence, the refrigerating cycle is able to be operated efficiently.

Further, in the present embodiment, when the battery temperature Tb is higher than the lower limit temperature Tlo within the controlled temperature range that is set to control the temperature of the battery 5, the control unit 40 sets a throttle for the third expansion valve 30. With such a configuration, when the battery temperature Tb is equal to or lower than the lower limit temperature Tlo, thermal energy of the battery 5 is not absorbed. Therefore, it is possible to ensure a capability to heat the interior space with only a small extent of degradation of battery performance due to heat absorption.

Furthermore, in the present invention, the air conditioner 10 for a vehicle includes the compressor 21, the external heat exchanger 23, the second expansion valve 26, and the second internal heat exchanger 24, and configures the refrigerating cycle by circulating the refrigerant among these elements. The air conditioner 10 for a vehicle further includes the battery heat exchanger 29, and the third expansion valve (throttle adjusting part) 30, and a part of the above-mentioned refrigerating cycle is configured by circulating the refrigerant also through these elements.

Here, in the cooling mode in which the second internal heat exchanger 24 acts as an evaporator, the control unit 40 of the air conditioner 10 for a vehicle controls the state of the third expansion valve 30 based on an extra capacity of a heat radiation amount, and a detection result of the battery temperature sensor 42. Here, the extra capacity of a heat radiation amount means an extra capacity of a heat radiation amount of the external heat exchanger 23 with respect to a heat absorption amount of the second internal heat exchanger 24 in terms of heat quantity. With such a configuration, as the battery 5 having a large heat capacity is added to a part of the refrigerating cycle, heat transport to the battery 5 is enabled by the refrigerating cycle. Thus, thermal energy is able to be radiated effectively, and the refrigerating cycle is thereby operated efficiently without causing an increase in load.

Yet further, in the present embodiment, when the external heat exchanger 23 has no extra capacity of a heat radiation amount, the control unit 40 opens the throttle of the third expansion valve 30. With such a configuration, it is possible to radiate excessive heat to the battery 5 through the battery heat exchanger 29, and cause the battery 5 to accumulate heat. Thus, it is possible to ensure a capability to cool the interior space, and reduce a load on the compressor 21. Therefore, the refrigerating cycle is able to be operated efficiently.

Yet further, in the present embodiment, when the battery temperature Tb is lower than the upper limit temperature Thi within the controlled temperature range that is set to control the temperature of the battery 5, the control unit 40 opens the throttle of the third expansion valve 30. With such a configuration, it is possible to radiate excessive heat to the battery 5 through the battery heat exchanger 29, and causes the battery 5 to accumulate heat. Thus, it is possible to ensure a capability to cool the interior space, and reduce a load on the compressor 21. Therefore, the refrigerating cycle is able to be operated efficiently.

Yet further, in the present embodiment, when the battery temperature Tb is higher than the upper limit temperature Thi within the controlled temperature range, the control unit 40 sets a throttle for the third expansion valve 30 so that the refrigerant that passes through the third expansion valve 30 is throttled and expanded. With such a configuration, when the battery temperature Tb is equal to or higher than the upper limit temperature Thi, thermal energy of the battery 5 is absorbed. Therefore, a high-temperature state of the battery 5 is avoided, thereby inhibiting degradation of battery performance.

The air conditioner 10 for a vehicle according to the embodiment of the present invention has been explained so far, but the present invention is not limited to the foregoing embodiment, and various changes may be made without departing from the scope of the invention. Specifically, in the air conditioner 10 for a vehicle shown in FIG. 1, the battery heat exchanger 29, the battery temperature sensor 42, and the blower 31 are arranged in the rear of the vehicle relative to the battery 5. However, the locations of the battery heat exchanger 29, the battery temperature sensor 42, and the blower 31 are not limited to this location, and may be any locations as long as heat is exchanged between the battery heat exchanger 29 and the battery 5. Specifically, the battery heat exchanger 29, the battery temperature sensor 42, and the blower 31 may be arranged in the front of the vehicle relative to the battery 5, or inside of the battery 5.

Further, in the air conditioner 10 for a vehicle shown in FIG. 1, the battery temperature sensor 42 is arranged between the battery heat exchanger 29 and the blower 31, but may be arranged at any location as long as the temperature of the battery 5 is measurable. Specifically, the battery temperature sensor 42 may be arranged in the front of the vehicle relative to the battery 5, or inside of the battery 5.

Yet further, in the foregoing embodiment, the present invention was explained using an electric vehicle as an example, but is not limited thereto. The present invention may be applicable to, for example, a hybrid vehicle using both an engine and an electric motor for running, and a fuel cell vehicle provided with a fuel cell as electricity generating means.

The entire content of Japanese Patent Application No. P2010-226499 (filed on Oct. 6, 2010) is herein incorporated by reference.

INDUSTRIAL APPLICABILITY

In the air conditioner for a vehicle according to the present invention, heat is transported from the battery by the refrigerating cycle by adding the battery heat exchanger to a part of the refrigerating cycle. Also, the air conditioner for a vehicle according to the present invention is characterized in that the battery heat exchanger is acted as a heat exchanger depending on an extra heat exchange capacity that indicates an extra capacity of the external heat exchanger with respect to the internal heat exchanger in terms of heat quantity. Therefore, thermal energy of the battery is able to be absorbed effectively in the refrigerating cycle, or thermal energy is able to be discharged to the battery 5 having a large heat capacity. As a result, it is possible to provide the air conditioner for a vehicle with excellent thermal efficiency.

REFERENCE SIGNS LIST

5 Battery
10 Air conditioner for a vehicle
21 Compressor
22 First internal heat exchanger (internal heat exchanger)
23 External heat exchanger
24 Second internal heat exchanger (internal heat exchanger)
25 First expansion valve
26 Second expansion valve
29 Battery heat exchanger
30 Third expansion valve (throttle adjusting part)
40 Control unit
42 Battery temperature sensor (temperature detector)

The invention claimed is:

1. An air conditioner for a vehicle comprising:
a compressor which compresses a refrigerant;
a first internal heat exchanger and a second internal heat exchanger which exchange heat between the refrigerant and air to be supplied into an interior space;
an external heat exchanger which exchanges heat between the refrigerant and outside air that is air outside of the interior space;
a battery installed in the vehicle;
a battery heat exchanger which exchanges heat between the refrigerant and the battery by causing at least a part of the refrigerant, which travels to the compressor from the external heat exchanger, to go through the battery heat exchanger;
a throttle adjusting part which is arranged in a refrigerant flow passage on an upstream side of the battery heat exchanger, and is structured to adjust a flow of the refrigerant via a throttle;
a control unit which controls the throttle adjusting part;
a first expansion valve which is provided in a downstream of the first internal heat exchanger, and throttles and expands the refrigerant by causing the refrigerant, which passed through the first internal heat exchanger, to go through the first expansion valve; and
a temperature detector which detects a temperature of the battery,
wherein the first internal heat exchanger exchanges heat between the refrigerant that is sent under pressure from the compressor, and air to be supplied into the interior space,
the external heat exchanger exchanges heat between the refrigerant that passed through the first expansion valve, and the outside air, and the refrigerant after heat is exchanged in the external heat exchanger returns to the compressor, and
wherein, in a heating mode in which the first internal heat exchanger acts as a condenser, extra heat exchange capacity is an extra capacity of a heat absorption amount of the external heat exchanger with respect to a heat radiation amount of the first internal heat exchanger in terms of heat quantity,
wherein, in a cooling mode, extra heat exchange capacity is an extra capacity of a heat radiation amount of the external heat exchanger with respect to a heat absorption amount of the second internal heat exchanger in terms of heat quantity, and
wherein, in the heating mode, the control unit controls the flow of the refrigerant through the throttle adjusting part based on the extra capacity of the heat absorption amount, which indicates whether or not the external heat exchanger is able to absorb a quantity of heat from the outside air, the quantity of heat being radiated by the first internal heat exchanger to air to be supplied into the interior space, and a detection result of the temperature detector.

2. The air conditioner for the vehicle according to claim 1, wherein, when the external heat exchanger lacks the extra capacity of the heat absorption amount, the control unit sets the throttle of the throttle adjusting part so that the refrigerant that passes through the throttle adjusting part is throttled and expanded.

3. The air conditioner for the vehicle according to claim 2, wherein the control unit sets the throttle of the throttle adjusting part when the detection result of the temperature detector is higher than a lower limit temperature of a controlled temperature range that indicates a temperature range in which the battery is able to provide a desired performance.

4. An air conditioner for a vehicle comprising:
a compressor which compresses a refrigerant;
a first internal heat exchanger and a second internal heat exchanger which exchange heat between the refrigerant and air to be supplied into an interior space;
an external heat exchanger which exchanges heat between the refrigerant and outside air that is air outside of the interior space;
a battery installed in the vehicle;
a battery heat exchanger which exchanges heat between the refrigerant and the battery by causing at least a part of the refrigerant, which travels to the compressor from the external heat exchanger, to go through the battery heat exchanger;
a throttle adjusting part which is arranged in a refrigerant flow passage on an upstream side of the battery heat exchanger, and is structured to adjust a flow of the refrigerant via a throttle;
a control unit which controls the throttle adjusting part;
a second expansion valve which is provided in a downstream of the external heat exchanger, and throttles and expands the refrigerant by causing the refrigerant, which passed through the external heat exchanger, to pass through the second expansion valve; and
a temperature detector which detects a temperature of the battery,
wherein the second internal heat exchanger exchanges heat between the refrigerant that passed through the second expansion valve, and air to be supplied into the interior space, and the refrigerant after heat is exchanged in the second internal heat exchanger returns to the compressor,
the external heat exchanger exchanges heat between the refrigerant that is sent under pressure from the compressor, and the outside air, and
wherein, in a heating mode in which the first internal heat exchanger acts as a condenser, extra heat exchange capacity is an extra capacity of a heat absorption amount of the external heat exchanger with respect to a heat radiation amount of the first internal heat exchanger in terms of heat quantity,
wherein, in a cooling mode in which the second internal heat exchanger acts as an evaporator, extra heat exchange capacity is an extra capacity of a heat radiation amount of the external heat exchanger with respect to a heat absorption amount of the second internal heat exchanger in terms of heat quantity, and wherein, in the cooling mode, the control unit controls the flow of the refrigerant through the throttle adjusting part based on the extra capacity of the heat radiation amount, which indicates whether or not the external heat exchanger is able to radiate a quantity of absorbed heat to the outside air, the quantity of absorbed heat being absorbed by the second internal heat exchanger from air to be supplied into the interior space, and a detection result of the temperature detector, such that the battery heat exchanger radiates heat to the battery.

5. The air conditioner for the vehicle according to claim 4, wherein the control unit opens the throttle of the throttle adjusting part when the external heat exchanger lacks the extra capacity of the heat radiation amount.

6. The air conditioner for the vehicle according to claim 5, wherein the control unit opens the throttle of the throttle adjusting part when the detection result of the temperature detector is lower than an upper limit temperature of a controlled temperature range that indicates a temperature range in which the battery is able to provide a desired performance.

7. The air conditioner for the vehicle according to claim 6, wherein, when the detection result of the temperature detector is equal to or higher than the upper limit temperature of the controlled temperature range, the control unit sets the throttle of the throttle adjusting part so that the refrigerant that passes through the throttle adjusting part is throttled and expanded.

8. A method for controlling an air conditioner for a vehicle, comprising:

providing a compressor which compresses a refrigerant; a first internal heat exchanger and a second internal heat exchanger which exchange heat between the refrigerant and air to be supplied into an interior space; an external heat exchanger which exchanges heat between the refrigerant and outside air that is air outside of the interior space; a battery installed in the vehicle; a battery heat exchanger which exchanges heat between the refrigerant and the battery by causing at least a part of the refrigerant, which travels to the compressor from the external heat exchanger, to go through the battery heat exchanger; a throttle adjusting part which is arranged in a refrigerant flow passage on an upstream side of the battery heat exchanger, and is structured to adjust a flow of the refrigerant; a first expansion valve which is provided in a downstream of the first internal heat exchanger, and throttles and expands the refrigerant by causing the refrigerant, which passed through the first internal heat exchanger, to go through the first expansion valve; and a temperature detector which detects a temperature of the battery, wherein the first internal heat exchanger exchanges heat between the refrigerant that is sent under pressure from the compressor, and air to be supplied into the interior space, and the external heat exchanger exchanges heat between the refrigerant that passed through the first expansion valve, and the outside air, and the refrigerant after heat is exchanged in the external heat exchanger returns to the compressor;

wherein, in a heating mode in which the first internal heat exchanger acts as a condenser, extra heat exchange capacity is an extra capacity of a heat absorption amount of the external heat exchanger with respect to a heat radiation amount of the first internal heat exchanger in terms of heat quantity, wherein, in a cooling mode, extra heat exchange capacity is an extra capacity of a heat radiation amount of the external heat exchanger with respect to a heat absorption amount of the second internal heat exchanger in terms of heat quantity, and wherein the method further comprises controlling, in the heating mode, the flow of the refrigerant through the throttle adjusting part based on the extra capacity of the heat absorption amount, which indicates whether or not the external heat exchanger is able to absorb a quantity of heat from the outside air, the quantity of heat being radiated by the first internal heat exchanger to air to be supplied into the interior space, and a detection result of the temperature detector.

9. A method for controlling an air conditioner for a vehicle, comprising:

providing a compressor which compresses a refrigerant; a first internal heat exchanger and a second internal heat exchanger which exchange heat between the refrigerant and air to be supplied into an interior space; an external heat exchanger which exchanges heat between the refrigerant and outside air that is air outside of the interior space; a battery installed in the vehicle; a battery heat exchanger which exchanges heat between the refrigerant and the battery by causing at least a part of the refrigerant, which travels to the compressor from the external heat exchanger, to go through the battery heat exchanger; a throttle adjusting part which is arranged in a refrigerant flow passage on an upstream side of the battery heat exchanger, and is structured to adjust a flow of the refrigerant; a second expansion valve which is provided in a downstream of the external heat exchanger, and throttles and expands the refrigerant by causing the refrigerant, which passed through the external heat exchanger, to pass through the second expansion valve; and a temperature detector which detects a temperature of the battery, wherein the second internal heat exchanger exchanges heat between the refrigerant that passed through the second expansion valve, and air to be supplied into the interior space, and the refrigerant after heat is exchanged in the second internal heat exchanger returns to the compressor, and the external heat exchanger exchanges heat between the refrigerant that is sent under pressure from the compressor, and the outside air;

wherein, in a heating mode in which the first internal heat exchanger acts as a condenser, extra heat exchange capacity is an extra capacity of a heat absorption amount of the external heat exchanger with respect to a heat radiation amount of the first internal heat exchanger in terms of heat quantity, wherein, in a cooling mode in which the second internal heat exchanger acts as an evaporator, extra heat exchange capacity is an extra capacity of a heat radiation amount of the external heat exchanger with respect to a heat absorption amount of the second internal heat exchanger in terms of heat quantity, and wherein the method further comprises controlling, in the cooling mode, the flow of the refrigerant through the throttle adjusting part based on the extra capacity of the heat radiation amount, which indicates whether or not the external heat exchanger is able to radiate a quantity of absorbed heat to the outside air, the quantity of absorbed heat being absorbed by the second internal heat exchanger from air to be supplied into the interior space, and a detection result of the temperature detector, such that the battery heat exchanger radiates heat to the battery.

* * * * *